United States Patent
Hallifax et al.

(10) Patent No.: US 12,142,775 B1
(45) Date of Patent: Nov. 12, 2024

(54) METHOD FOR MANUFACTURING A CO-AXIAL GLASS-TO-METAL SEAL FEEDTHROUGH FOR A CASE-NEUTRAL ELECTROCHEMICAL CELL

(71) Applicant: Greatbatch Ltd., Clarence, NY (US)

(72) Inventors: Paul T. Hallifax, Gasport, NY (US); Michael F. Scalise, Clarence, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 18/779,276

(22) Filed: Jul. 22, 2024

Related U.S. Application Data

(63) Continuation-in-part of application No. 18/437,703, filed on Feb. 9, 2024, now Pat. No. 12,095,102.

(60) Provisional application No. 63/444,629, filed on Feb. 10, 2023.

(51) Int. Cl.

| | |
|---|---|
| *H01M 50/191* | (2021.01) |
| *H01M 6/00* | (2006.01) |
| *H01M 10/0525* | (2010.01) |
| *H01M 50/119* | (2021.01) |
| *H01M 50/172* | (2021.01) |
| *H01M 50/184* | (2021.01) |
| *H01M 50/198* | (2021.01) |

(52) U.S. Cl.
CPC .......... *H01M 50/191* (2021.01); *H01M 6/00* (2013.01); *H01M 10/0525* (2013.01); *H01M 50/119* (2021.01); *H01M 50/172* (2021.01); *H01M 50/184* (2021.01); *H01M 50/198* (2021.01)

(58) Field of Classification Search
CPC .. H01M 10/0525; H01M 6/00; H01M 50/191; H01M 50/198; H01M 50/184; H01M 50/119; H01M 50/172; H01B 17/305; H01B 17/30
See application file for complete search history.

(56) References Cited

U.S. PATENT DOCUMENTS

| | | | |
|---|---|---|---|
| 4,308,323 A | 12/1981 | Bowsky | |
| 4,678,358 A | 7/1987 | Layher | |
| 4,915,719 A | 4/1990 | Saffari | |
| 5,013,615 A | 5/1991 | Sisolak | |
| 6,569,562 B1 | 5/2003 | Spillman et al. | |
| 6,610,443 B2 | 8/2003 | Paulot et al. | |
| 6,661,168 B1 | 12/2003 | Hartley et al. | |

(Continued)

OTHER PUBLICATIONS

Hellstrom, Eric , "Crystallization in TA-23 Glass", Jan. 1986, 1-39.

(Continued)

*Primary Examiner* — Haroon S. Sheikh
*Assistant Examiner* — Kan Luo
(74) *Attorney, Agent, or Firm* — Michael F. Scalise

(57) ABSTRACT

A case-neutral electrochemical cell has an electrode assembly comprising a separator positioned between an anode and a cathode housed inside a casing. The casing supports a co-axial glass-to-metal seal comprising an inner insulating glass hermetically sealed to a terminal pin and to the inner surface of a first or inner ferrule. An outer insulating glass is hermetically sealed to the outer surface of the inner ferrule and the inner surface of a second or outer ferrule, and the outer ferrule is secured to an opening in the casing. Then, one of the anode and the cathode is connected to the terminal pin and the other of the anode and the cathode is connected to the first or inner ferrule. An electrolyte is provided in the casing to activate the electrode assembly.

21 Claims, 6 Drawing Sheets

(56) References Cited

U.S. PATENT DOCUMENTS

| | | |
|---|---|---|
| 6,759,163 B2 | 7/2004 | Frysz et al. |
| 7,128,765 B2 | 10/2006 | Paulot et al. |
| 9,123,930 B1 | 9/2015 | Freitag |
| 2005/0255380 A1 | 11/2005 | Lasater et al. |
| 2009/0181298 A1 | 7/2009 | Farrell et al. |
| 2017/0149028 A1 | 5/2017 | Kroll et al. |

OTHER PUBLICATIONS

Watkins, Randall D., "Development of CABAL Glasses for Use in Lithium Ambient-Temperature Batteries", Jun. 1987, 1-21.

METHOD FOR MANUFACTURING A CO-AXIAL GLASS-TO-METAL SEAL FEEDTHROUGH FOR A CASE-NEUTRAL ELECTROCHEMICAL CELL

CROSS-REFERENCE TO RELATED APPLICATIONS

This application is a continuation-in-part of U.S. patent application Ser. No. 18/437,703, filed on Feb. 9, 2024, now U.S. Pat. No. 12,095,102, which claims priority to U.S. provisional patent application Ser. No. 63/444,629, filed on Feb. 10, 2023.

BACKGROUND OF THE INVENTION

1. Field of the Invention

The present invention generally relates to the conversion of chemical energy to electrical energy and, more particularly, to a novel co-axial glass-to-metal seal (GTMS) design for hermetically sealing a case-neutral electrochemical cell.

A glass-to-metal seal is considered critical because it hermetically isolates the internal environment of a component from the external environment to which the component is exposed. In an electrochemical cell powering an implantable medical device, the GTMS supports at least one terminal pin that extends from inside the cell casing to outside the casing while simultaneously hermetically sealing the internal cell chemistry from the external device environment.

2. Prior Art

A conventional glass-to-metal seal (GTMS) for an electrochemical cell typically consists of a sleeve-shaped ferrule that is welded into an opening in the cell casing, such as in an opening in the casing lid or the casing body itself. The insulating glass seals around the perimeter of a terminal pin and the ferrule supports the insulating glass in a surrounding relationship. The terminal pin extends from inside the casing to a position outside the casing and serves as the lead for one of the electrodes. Typically, the terminal pin is connected to the cathode current collector. The casing including the lid serves as the second terminal for the other electrode, typically the anode. This configuration is referred to as a case-negative cell design. Alternatively, if a case-positive cell design is desired, the anode is connected to the terminal pin and the cathode is connected to the cell casing, which includes the casing lid and ferrule.

However, there are cell designs that are neither case-negative nor case-positive. Instead, they are case-neutral. In a case-neutral cell design, the casing including its lid connected to a ferrule is not connected to either the anode or the cathode. Instead, as described in U.S. Pat. No. 9,123,930 to Freitag, which is assigned to the assignee of the present invention and incorporated herein by reference, the lid supports two glass-to-metal seals. The terminal pin of the first GTMS is connected to the anode and the terminal pin of the second GTMS is connected to the cathode. This means that the casing lid must be large enough to support both GTMSs. However, modern cell designs are being driven by the ever-progressing desire to make implantable devices smaller and smaller without compromising functionality. This means that there is not always enough space in a casing lid to accommodate two GTMSs while maintaining the case-neutral design.

What is therefore needed is an electrochemical cell that is built in a case-neutral design having a single terminal pin that is connected to one of the anode and the cathode. The other of the anode and the cathode is connected to an inner ferrule that is positioned inside an outer sealing glass sealed to the inner ferrule and an outer ferrule connected to the cell casing, for example, the lid. That way, the inner ferrule is electrically isolated from both the outer ferrule/lid and the terminal pin.

Accordingly, the present invention provides an electrochemical cell that is built in a case-neutral design and a manufacturing process thereof that overcomes the shortcomings of the prior art for case-neutral cell designs.

SUMMARY OF THE INVENTION

The present invention is directed to a hermetic co-axial glass-to-metal seal (GTMS) comprising a terminal pin that is electrically isolated from a first or inner ferrule by a first or inner insulating glass. The inner ferrule supporting the terminal pin and the inner insulating glass is itself supported in a second or outer ferrule by a second or outer insulating glass that is hermetically sealed to both the inner ferrule and the outer ferrule. The outer ferrule is welded into an opening in the cell casing.

The individual materials chosen for the components comprising the co-axial GTMS are critical and must meet the following design criteria. First, the terminal pin must be corrosion resistant to the internal cell chemistry, be weldable and modifiable for attachment to the end user's product and have sufficient electrical conductivity for a particular cell design. Secondly, the inner and outer insulating glasses need to be corrosion resistant to the internal cell chemistry and have sufficient electrical insulation for the particular cell design. Lastly, the inner and outer ferrules must be corrosion resistant to the internal cell chemistry, have sufficient electrical conductivity for the particular cell design, and be weldable for secondary operations.

These components are manufactured into a co-axial glass-to-metal seal by assembling the terminal pin in an opening in an inner sleeve-shaped sealing glass, which is positioned in an opening in an inner ferrule. The inner ferrule is positioned in an opening in an outer sleeve-shaped sealing glass which is positioned in an opening in an outer ferrule. This assembly is then subjected to a heat treatment in a furnace. The heat treatment simultaneously hermetically seals the inner sealing glass to the terminal pin and an inner opening surface of the inner ferrule and hermetically seals the outer insulating glass to an outer surface of the inner ferrule and an inner opening surface of the outer ferrule to provide the co-axial GTMS.

The furnace may comprise a tube furnace, a box or batch furnace, a continuous belt furnace, and the like. The furnace may also comprise a single or a plurality of heating zones which constitute the heating profile for the heat treatment.

The resultant co-axial GTMS must also meet the following design criteria: the assembly must be hermetic, the inner and outer insulating glasses must exhibit acceptable visual characteristics, i.e., have no cracks that affect function, and there must be sufficient electrical isolation between the terminal pin and the first or inner ferrule and between the inner ferrule and the second or outer ferrule for the cell design. Also, the co-axial GTMS must exhibit acceptable thermal durability to secondary processing such as welding, and it must be mechanically tolerant to secondary processing such as terminal pin bending.

These and other aspects of the present invention will become increasingly more apparent to those skilled in the art by reference to the following detailed description and to the appended drawings.

DETAILED DESCRIPTION OF THE PREFERRED EMBODIMENTS

The term "glass softening temperature" is the minimum temperature at which a glass begins to deform under its own weight. As defined herein, the "glass softening temperature" is the temperature at which a glass fiber having a diameter ranging from 0.55 mm to 0.75 mm and a length of 23.5 cm elongates under its own weight at a rate of 1 mm/min.

The term "glass working temperature" is herein defined as the temperature at which a glass has a viscosity of about 104 poise. (For support, see Fundamentals of Inorganic Glasses, Arun K. Varshneya, 1994 p. 189.)

The glass softening temperature is generally at a lower temperature than the glass working temperature. The temperature interval between the glass softening point and the glass working point is herein defined as the "glass working range".

The term "viscosity" is herein defined as the resistance to flow in a fluid or semi-fluid.

The term "heat treatment" or "heating profile" is herein defined as the application of heat starting at room temperature and increasing in a controlled manner to a maximum heating temperature and then decreasing the application of heat in a controlled manner back to room temperature. The heat treatment or heating profile may comprise a plurality of different heating or cooling rates as well as a plurality of temperature plateaus at which a temperature is held constant for a period of time.

Figure 1:
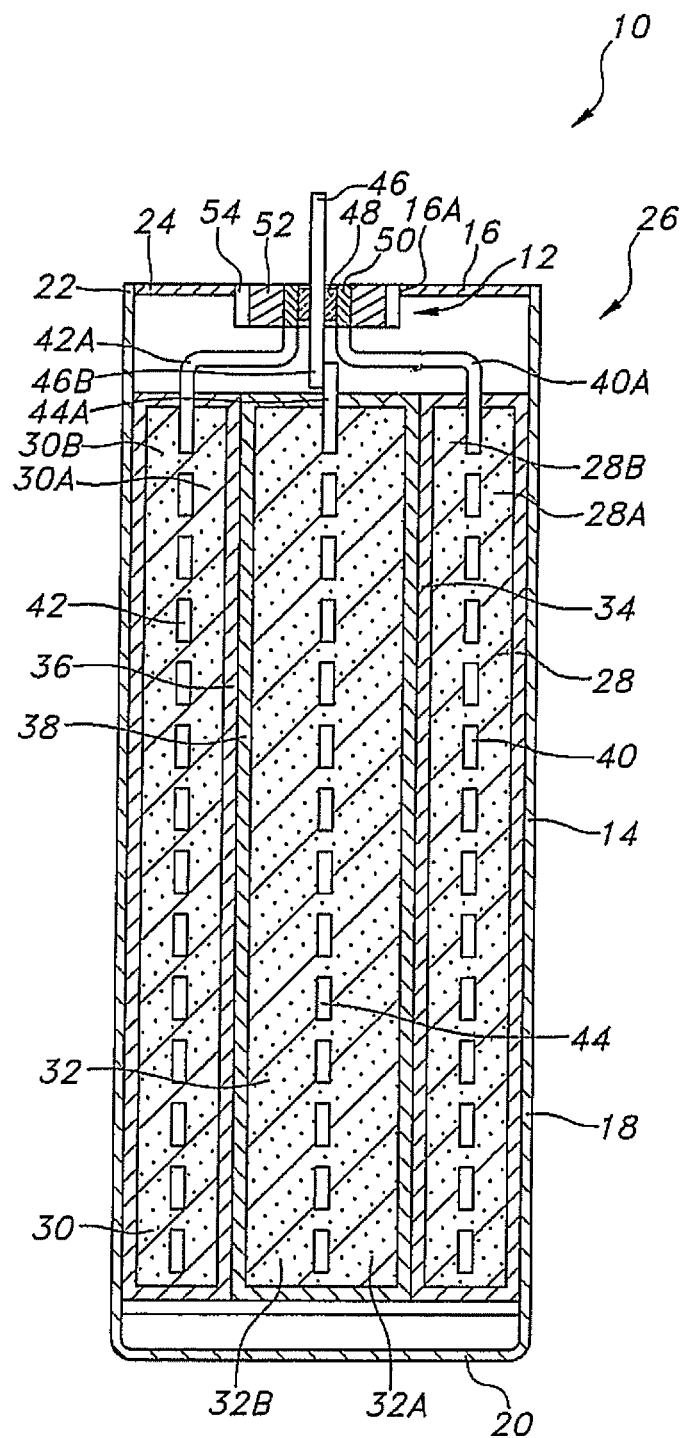
FIG. 1 is a cross-sectional view of an exemplary case-neutral electrochemical cell 10 including a co-axial glass-to-metal seal (GTMS) 12 according to the present invention.
Figure 1A:
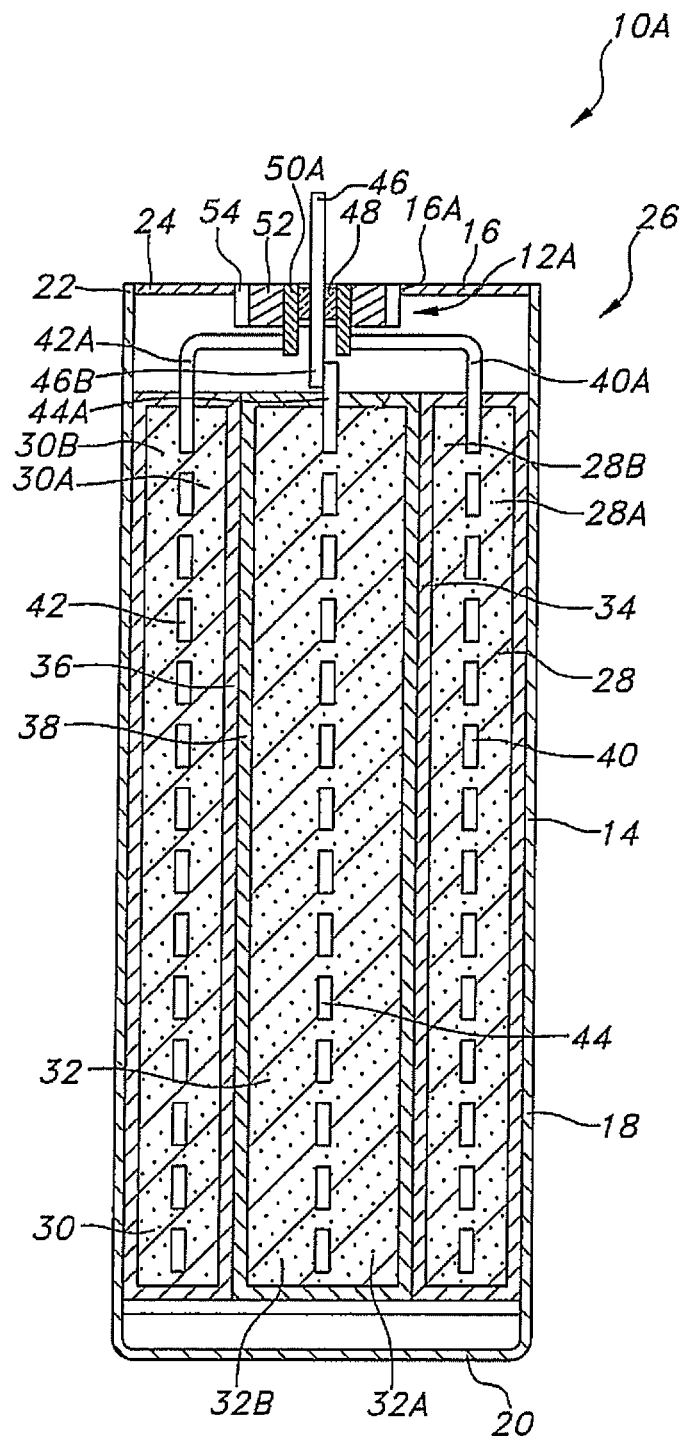
FIG. 1A is a cross-sectional view of another exemplary case-neutral electrochemical cell 10A including an alternate embodiment of a co-axial GTMS 12A according to the present invention.
Figure 2:
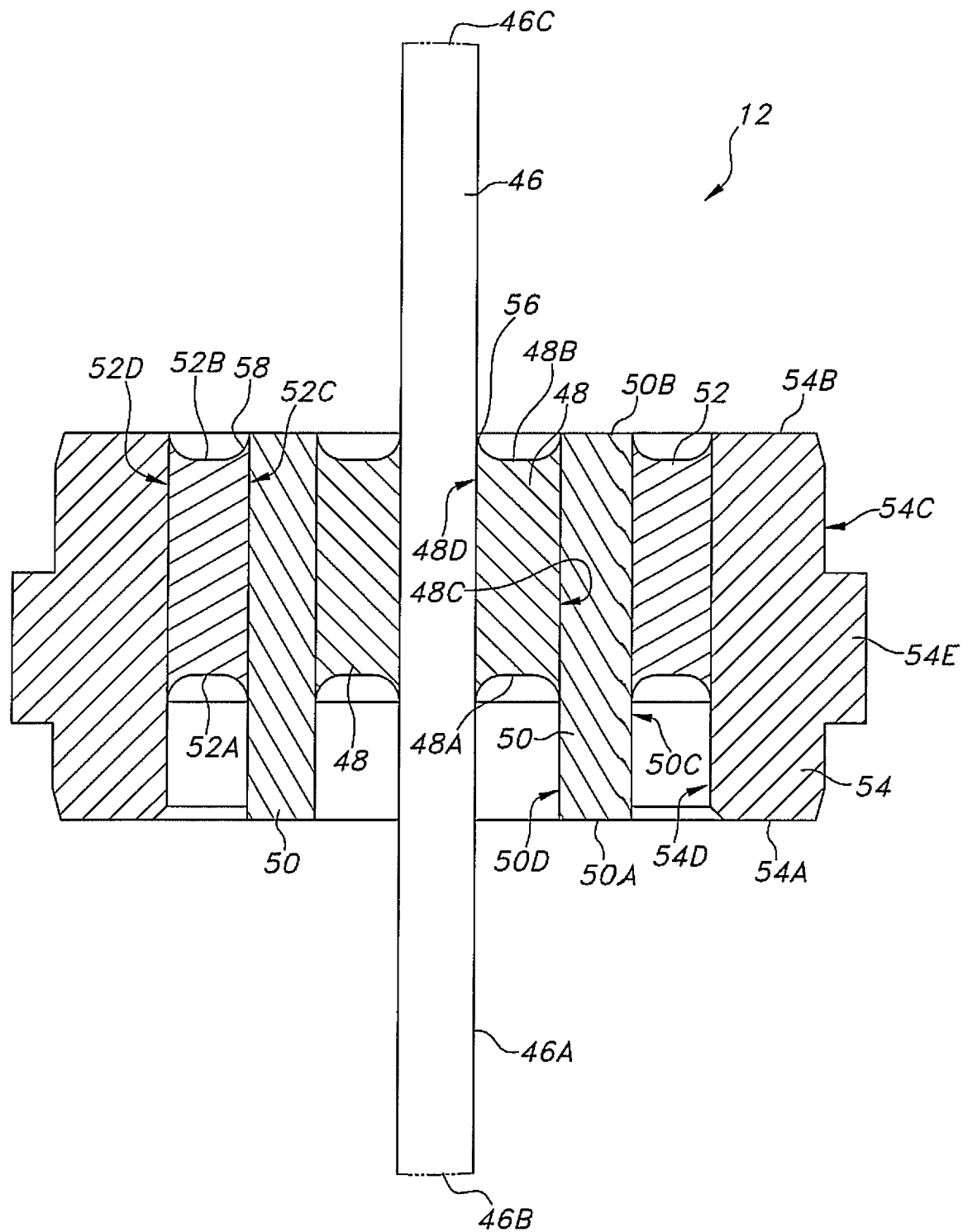
FIG. 2 is a cross-sectional view of the co-axial GTMS 12 shown in the case-neutral electrochemical cell 10 of FIG. 1.
Figure 5:
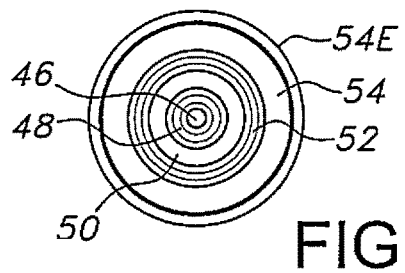
FIG. 5 is a plan view of the co-axial GTMS 12 shown in FIGS. 1 to 4.
Figure 4:
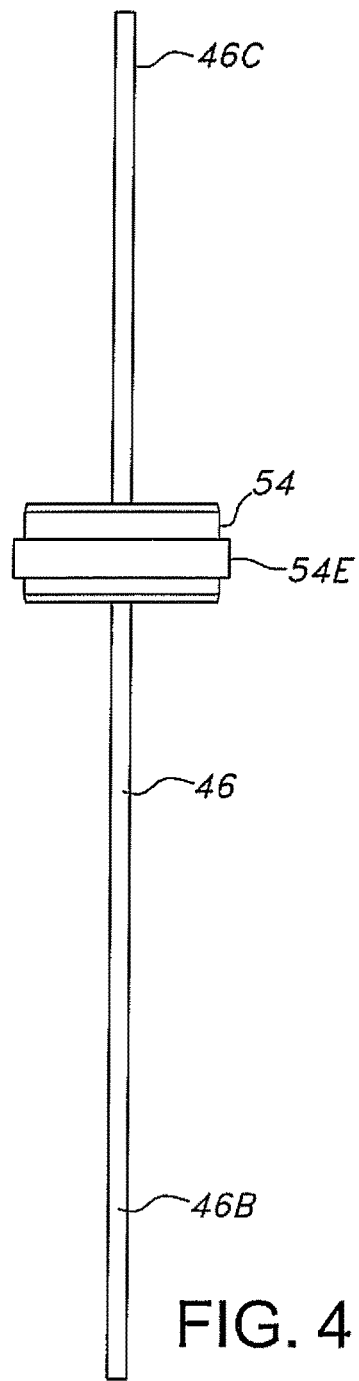
FIG. 4 is a side elevational view of the co-axial GTMS 12 shown in FIGS. 1 to 3.
Figure 3:
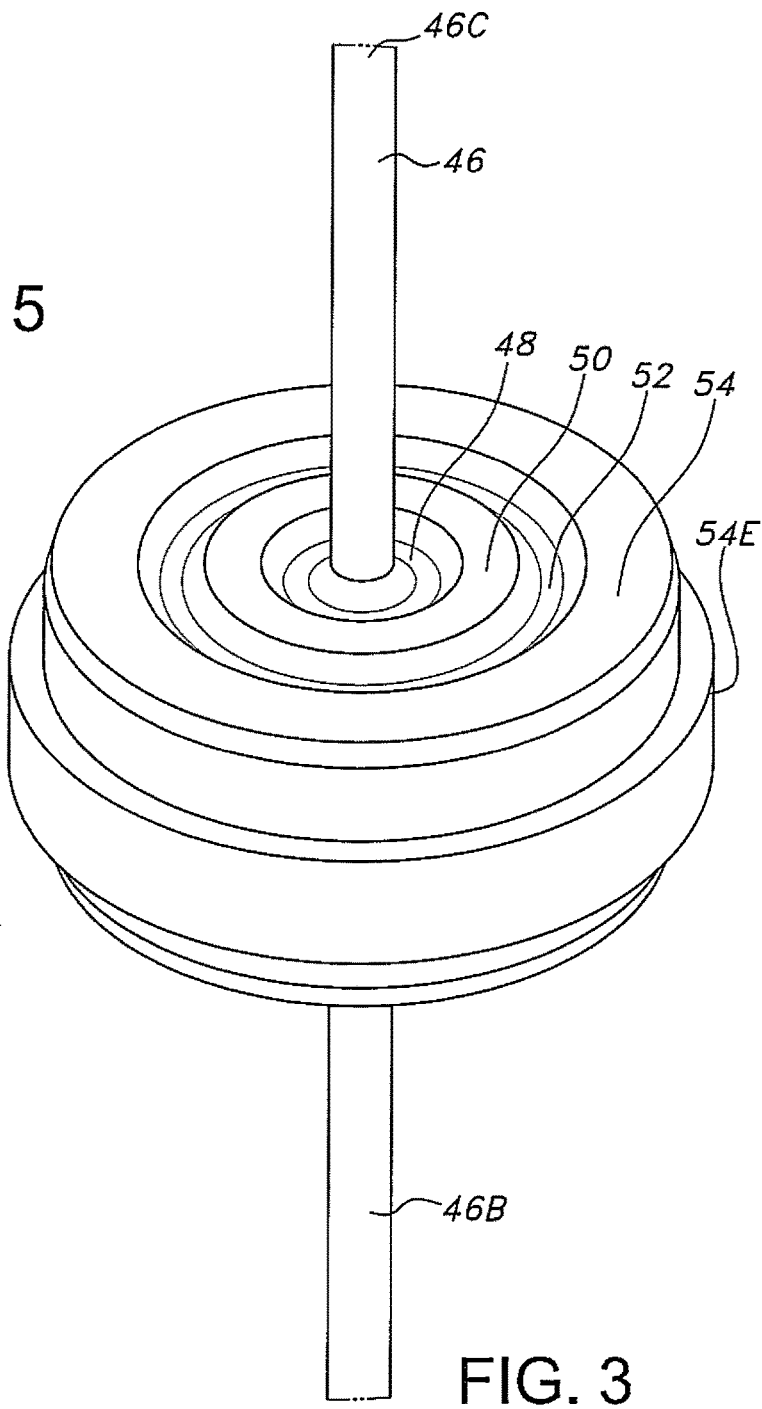
FIG. 3 is a perspective view of the co-axial GTMS 12 shown in FIGS. 1 and 2.

Turning now to the drawings, FIGS. 1 and 1A illustrate two exemplary case-neutral electrochemical cells 10 and 10A according to the present invention. The exemplary nature of the cells 10, 10A is intended to provide context to the respective co-axial GTMSs 12 and 12A of the present invention. The exemplary case-neutral electrochemical cells 10, 10A comprise an open-ended container 14 closed by a lid 16. The container 14 has an annular sidewall 18 extending upwardly from a bottom wall 20 to an annular upper edge 22. The lid 16 is a plate-shaped member extending to an annular edge 24. The edge 24 of the lid 16 is welded to the upper edge 22 of the container 14 to close the container and provide a casing 26 for the electrochemical cells 10, 10A.

In the illustrated exemplary electrochemical cells 10, 10A, the electrode assembly comprises two spaced-apart first electrodes 28 and 30 that are positioned on opposite sides of a second, opposite polarity electrode 32. The first electrodes 28, 30 are housed in respective separator envelopes 34 and 36, and the second electrode 32 is housed in its own separator envelope 38.

In one embodiment of the electrode assembly, the first electrodes 28, 30 are anodes comprising anode active material supported on respective anode current collectors 40 and 42, and the second electrode 32 is a cathode comprising cathode active material supported on a cathode current collector 44. In another embodiment, the first electrodes 28, 30 are cathodes comprising cathode active material supported on respective cathode current collectors 40, 42, and the second electrode is an anode comprising anode active material supported on an anode current collector 44.

With respect to the first embodiment of the electrode assembly, the right anode 28 is comprised of opposed plates 28A and 28B of anode active material that are contacted to an intermediate anode current collector 40. A tab 40A extends upwardly from the right anode current collector 40. Similarly, the left anode 30 is comprised of opposed plates 30A and 30B of anode active material that are contacted to an intermediate anode current collector 42. A tab 42A extends upwardly from the left anode current collector 42. The cathode 32 is comprised of opposed plates 32A and 32B of cathode active material that are contacted to the opposite major sides of an intermediate cathode current collector 44. A tab 44A extends upwardly from the cathode current collector 44.

In the second embodiment of the electrode assembly, the right cathode 28 is comprised of opposed plates 28A and 28B of cathode active material that are contacted to an intermediate cathode current collector 40. A tab 40A extends upwardly from the right cathode current collector 40. Similarly, the left cathode 30 is comprised of opposed plates 30A and 30B of cathode active material that are contacted to an intermediate cathode current collector 42. A tab 42A extends upwardly from the left cathode current collector 42. The anode 32 is comprised of opposed plates 32A and 32B of anode active material that are contacted to the opposite major sides of an intermediate anode current collector 44. A tab 44A extends upwardly from the anode current collector 44.

FIGS. 2 to 5 show an exemplary embodiment of the co-axial glass-to-metal seal 12 according to the present invention incorporated into the case-neutral electrochemical cell 10 shown in FIG. 1. As particularly shown in FIG. 2, the exemplary co-axial GTMS 12 comprises a terminal pin 46 supported by an inner sleeve-shaped sealing glass 48 which is supported by an inner ferrule 50. The inner ferrule 50 is supported by an outer sleeve-shaped sealing glass 52 which is supported by an outer ferrule 54. The outer ferrule 54 is welded into an opening in the cell casing, such as in an opening in the lid 16 or in an opening in the casing container 18.

The first sleeve-shaped sealing glass 48 extends from an inner meniscus end 48A to an outer meniscus end 48B. The inner and outer ends 48A, 48B in turn extend to an outer annular surface 48C spaced from an inner annular surface 48D of the first glass sleeve 48. The inner annular surface 48D defines a cylindrically-shaped opening 56.

The terminal pin 46 is positioned in the cylindrically-shaped opening 56 of the first sleeve-shaped sealing glass 48. The terminal pin 46 is a rod-shaped member having an annular sidewall 46A that extends from a proximal end 46B to a distal end 46D. When the co-axial GTMSs 10, 10A of the present invention are built into the case-neutral electrochemical cells 10, 10A (FIGS. 1 and 1A), the proximal pin end 46B extends into the interior of the casing 26 and the distal pin end 46C resides outside the casing to provide for connection to a load which the cell 10 is intended to power.

The inner ferrule 50 is a sleeve-shaped member having an annular sidewall that extends from an inner end 50A to an outer end 50B. The inner and outer ends 50A, 50B in turn extend to an outer annular surface 50C spaced from an inner annular surface 50D.

The outer sleeve-shaped sealing glass 52 resides outwardly from the inner sealing glass 48 and is a sleeve-shaped member having an annular sidewall that extends from an inner meniscus end 52A to an outer meniscus end 52B. The inner and outer ends 52A, 52B in turn extend to an inner annular surface 52C spaced from an outer annular surface 52D. The inner annular surface 52D defines a cylindrically-shaped opening 58.

The outer ferrule 54 is a sleeve-shaped member having an annular sidewall that resides outwardly from the inner ferrule 50. The outer ferrule 54 has an annular sidewall that extends from an inner end 54A to an outer end 54B. The inner and outer ends 54A, 54B in turn extend to an outer annular surface 54C spaced from an inner annular surface 54D. An annular protrusion 54E extending outwardly from the outer annular surface 54C is spaced from the inner and outer ends 54A, 54B.

With the terminal pin 46 positioned in the cylindrically-shaped opening 56 of the inner sleeve-shaped sealing glass 48, the inner annular surface 48D of the inner sealing glass 48 contacts the annular sidewall 46A of the terminal pin 46 and the inner annular surface 50D of the inner ferrule 50 contacts the outer annular surface 48C of the inner sealing glass 48.

The inner ferrule 50 supporting the inner sealing glass 48 and the terminal pin 46 is sized to fit into the cylindrically-shaped opening 58 provided by the outer sealing glass 52. In this position, the outer annular surface 50C of the inner ferrule 50 contacts the inner annular surface 52C of the outer sealing glass 52 and the outer annular surface 52D of the outer sealing glass 52 contacts the inner annular surface 54D of the outer ferrule 54.

This assembly is then subjected to a heating protocol to simultaneously melt the inner and outer sealing glasses 48 and 52. The heating protocol causes the inner sealing glass 48 to flow into intimate sealing contact with the terminal pin 46, and the inner surface 50D of the inner ferrule 50 as the outer sealing glass 52 flows into intimate sealing contact with the outer surface 50C of the inner ferrule 50 and the inner surface 54D of the outer ferrule 54. When the molten inner and outer sealing glasses 48 and 52 cool, the inner sealing glass 48 hermetically seals to the terminal pin 46 and the inner annular surface 50D of the inner ferrule 50 and the outer sealing glass 52 hermetically seals to the outer annular surface 50C of the inner ferrule 50 and the inner annular surface 54D of the outer ferrule 54. This forms the co-axial GTMS 12 for use in the case-neutral electrochemical cell 10 according to the present invention.

In one preferred embodiment, the inner and outer insulating glasses 48 and 52 comprise "TA-23", which is an alkaline earth aluminosilicate type glass developed by Sandia National Labs. TA-23 has a softening temperature of about 862° C., a working temperature that ranges from about 1,000° C. to about 1,100° C., and a working range temperature interval from about 175° C. to about 275° C. This means that one preferred embodiment of a heat treatment using TA-23 ranges from about 900° C. to about 950° C.

In another preferred embodiment, the inner and outer insulating glasses 48 and 52 are Cabal-12, which is a calcium-boro-aluminate type glass that was also developed by Sandia National Labs. Cabal-12 has a softening temperature of about 726° C., a working temperature that ranges from about 775° C. to about 825° C., and a working range temperature interval from about 50° C. to about a 135° C. This means that one preferred embodiment of a heat treatment using TA-23 ranges from about 750° C. to about 770° C.

In still another preferred embodiment, the inner and outer insulating glasses 48 and 52 are Schott 8245, which has a softening temperature of about 680° C.

Preferably, the softening temperatures of the inner and outer insulating glasses 48 and 52 for the co-axial GTMSs 12, 12A of the preset invention are substantially equal.

Further, the terminal pin 46 is preferably composed of an electrically conductive material, for example, MP35N, stainless steel, titanium alloy, platinum, platinum alloys, palladium, palladium alloys or a refractory metal such as molybdenum. The casing 26 comprising the open-ended container 18 closed by the lid 16 is preferably composed of a metallic material including stainless steel, such as 304L SS or a titanium alloy, mild steel, nickel-plated mild steel, and aluminum. Preferred materials for the inner and outer ferrules 50 and 54 include titanium, stainless steel, mild steel, nickel-plated mild steel, and aluminum.

The co-axial GTMS 12 is then hermetically secured to the casing 26. This is done by welding the outer ferrule 54 in a suitably sized opening in the lid 16. The annular protrusion 54E extending outwardly from the outer annular surface 54C of the outer ferrule 54 helps ensure that the upper ends 50B and 52B of the respective inner and outer ferrules 50 and 54 are substantially flush with the upper surface of the lid 16. In the exemplary electrochemical cell 10 shown in FIG. 1, the inner ends 50A and 54A of the respective inner and outer ferrule 50, 54 extend into the interior of the casing and are aligned along a common plane.

With the exception of the co-axial GTMS 12A, the exemplary case-neutral electrochemical cell 10A shown in FIG. 1A is constructed in a similar manner as the just described electrochemical cell 10 shown in FIG. 1. In the exemplary electrochemical cell 10A shown in FIG. 1A, however, the inner end 54A of the inner ferrule 50 extends a greater distance into the interior of the casing 26 than the inner surface 54A of the outer ferrule. This is a significant distinction because the extending inner ferrule 50 makes it easier to connect the current collector tabs 40A and 42A to the inner ferrule 50 than in the GTMS 10 shown in FIG. 1.

Once the co-axial GTMS 12 is created and the outer ferrule 54 is welded into an opening 16A in the lid 16, the proximal end 46B of the terminal pin 46 is electrically connected to either the anode or the cathode housed inside the cell casing 26 and the other of the anode and the cathode is electrically connected to the inner ferrule 50 (FIGS. 1 and 1A).

After the terminal pin 46 and the inner ferrule 50 are electrically connected to their respective electrode, the lid 16 is hermetically secured to the annular edge 22 at the open end of the container 18. The lid 16 may be hermetically sealed to the casing container 18 through such joining means as laser welding, resistance welding, ultrasonic welding, magnetic force welding, arc welding, soldering, and the like. An activating electrolyte (not shown) is then filled into the casing 26 through an electrolyte fill port or fill opening (not shown) in the lid 16.

In one embodiment, the electrochemical cells 10 and 10A are secondary or rechargeable cells. In a secondary system, the anode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode of a secondary cell preferably comprises a lithiated material that is stable in air and readily handed. Examples of such air-stable lithiated cathode materials include oxides, sulfides, selenides, and tellurides of such metals as vanadium, titanium, chromium, copper, molybdenum, niobium, iron, nickel, cobalt, and manganese. The more preferred oxides include $LiNiO_2$, $LiMn_2O_4$, $LiCoO_2$, $LiCO_{0.92}SnO_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium, and stainless steel. The cathode further comprises a fluoro-resin binder, preferably in a powder form, such as PTFE, PVDF, ETFE, polyamides and polyimides, and mixtures thereof. The current collector is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable nonaqueous electrolytes for a secondary electrochemical systems comprise an inorganic salt dissolved in a nonaqueous solvent and, more preferably, a lithium metal salt dissolved in a quaternary mixture of organic carbonate solvents comprising a dialkyl (non-cyclic) carbonate selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

In another embodiment, the electrochemical cells 10 and 10A are primary cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector.

The cathode for a primary cell is an electrically conductive material, preferably a solid material. The solid cathode may comprise a metal element, a metal oxide, a mixed metal oxide, a metal sulfide, and combinations thereof. A preferred cathode active material is selected from silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell 10, 10A, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, and stainless steel. The preferred cathode active mixture thus includes a powdered fluoro-polymer binder present at about 3 weight percent, a conductive diluent present at about 3 weight percent and about 94 weight percent of the cathode active material.

The cathode may be prepared by rolling, spreading, or pressing the cathode active mixture onto a suitable cathode current collector. Cathodes prepared as described are preferably in the form of a strip wound with a corresponding strip of anode material in a structure similar to a "jellyroll" or a flat-folded electrode stack.

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material. Suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents for a primary system include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents for a primary system include cyclic carbonates, cyclic esters, and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

Regardless of whether the electrochemical cell 10, 10A is a primary or secondary system, in order to prevent internal short circuit conditions, the cathode is separated from the anode by at least one separator 34, 36 and 38. A suitable separator is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The lid 16 has an opening that is sized to receive the co-axial GTMS 12, 12A of the present invention connected to the anode electrically isolated from the cathode. An additional opening is provided for electrolyte filling. The casing 26 is thereafter filled with the electrolyte described hereinabove and hermetically sealed such as by close-welding a titanium plug over the fill hole, but not limited thereto.

Figure 6:
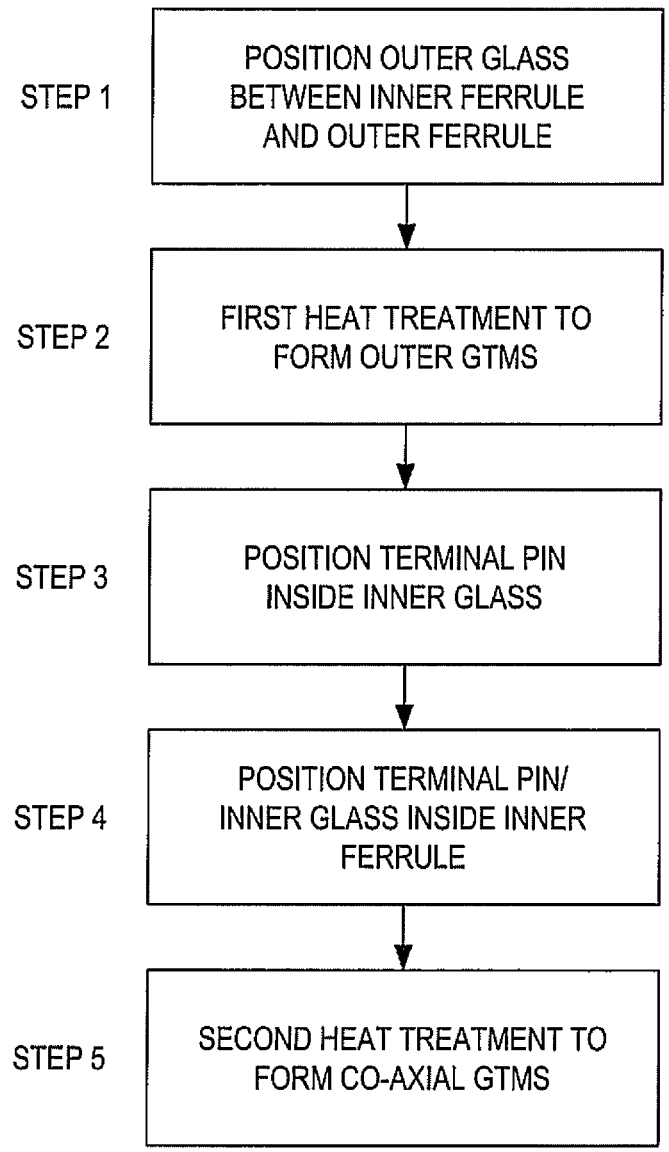
FIG. 6 is a flow chart of a first series of steps for manufacturing a co-axial glass-to-metal seal feedthrough for a case-neutral electrochemical cell according to the present invention.

FIG. 6 is a flow chart of a first series of steps for manufacturing a co-axial glass-to-metal seal feedthrough for a case-neutral electrochemical cell according to the present invention. In STEP 1, an outer glass is positioned between an inner ferrule and an outer ferrule. In STEP 2, the assembly from STEP 1 is subjected to a first heat treatment to form an outer GTMS. In STEP 3, a terminal pin is positioned inside an inner glass. In STEP 4, the terminal pin/inner glass from STEP 3 is positioned inside an inner ferrule. In STEP 5, the assembly from STEP 4 is subjected to a second heat treatment to form a co-axial GTMS.

Figure 7:
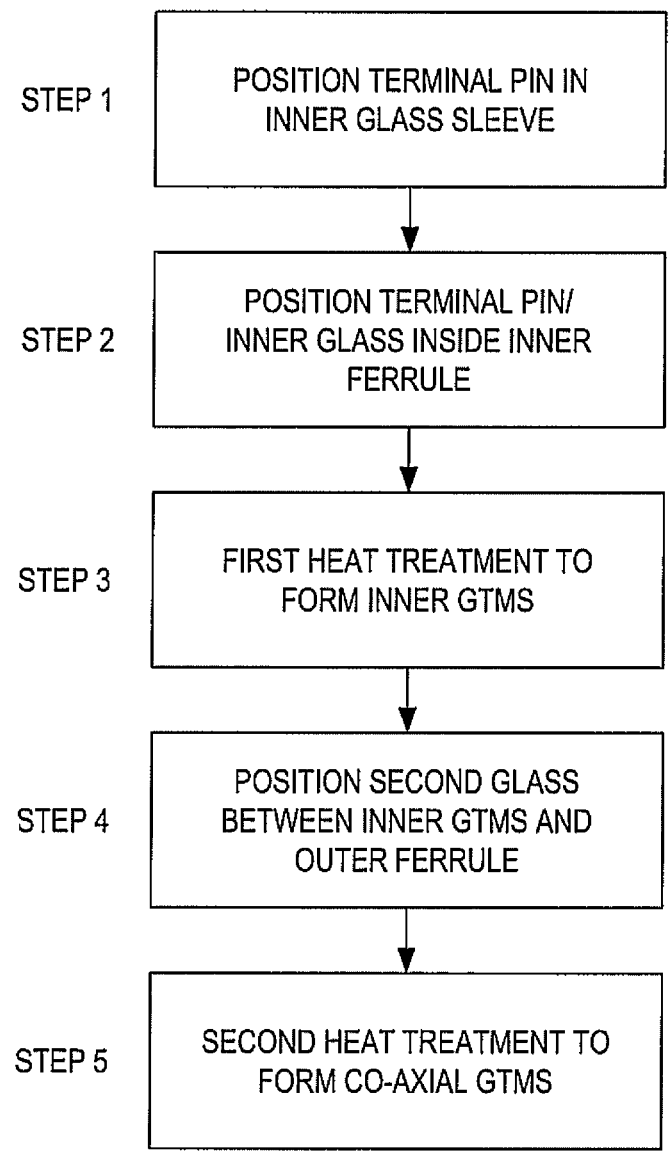
FIG. 7 is a flow chart of a second series of steps for manufacturing a co-axial glass-to-metal seal feedthrough for a case-neutral electrochemical cell according to the present invention.

FIG. 7 is a flow chart of a second series of steps for manufacturing a co-axial glass-to-metal seal feedthrough for a case-neutral electrochemical cell according to the present invention. In STEP 1, a terminal pin is positioned inside an inner glass sleeve. In STEP 2, the terminal pin/inner glass sleeve from STEP 1 is positioned inside an inner ferrule. In STEP 3, the assembly from STEP 2 is subjected to a first heat treatment to form an inner GTMS. In STEP 4, a second glass is positioned between the inner GTMS from STEP 3 and an outer ferrule. In STEP 5, the assembly from STEP 4 is subjected to a second heat treatment to form a second co-axial GTMS.

It is appreciated that various modifications to the inventive concepts described herein may be apparent to those of ordinary skill in the art without departing from the spirit and scope of the present invention as defined by the appended claims.

What is claimed is:

1. A method for making a co-axial glass-to-metal seal (GTMS), comprising the steps of:
    a) providing a terminal pin extending along a terminal pin axis;
    b) providing an inner ferrule comprising an inner ferrule sidewall extending to an inner ferrule first end spaced from an inner ferrule second end, wherein the inner ferrule first and second ends extend to an inner ferrule inner annular surface defining an inner ferrule opening opposite an inner ferrule outer annular surface;
    c) providing a sleeve-shaped inner insulating glass extending to an inner glass first end spaced from an inner glass second end, wherein the inner glass first and second ends extend to an inner glass inner annular surface defining an inner glass opening opposite an inner glass outer annular surface;
    d) providing an outer ferrule comprising an outer ferrule sidewall extending to an outer ferrule first end spaced from an outer ferrule second end, wherein the outer ferrule first and second ends extend to an outer ferrule inner annular surface defining an outer ferrule opening opposite an outer ferrule outer annular surface; and
    e) providing a sleeve-shaped outer insulating glass having an outer glass opening extending to an outer glass first end spaced from an outer glass second end, wherein the outer glass first and second ends extend to an outer glass inner annular surface defining an outer glass opening opposite an outer glass outer annular surface;
    f) positioning the terminal pin in the inner glass opening, positioning the inner insulating glass in the inner ferrule opening, positioning the inner ferrule in the outer glass opening, and positioning the outer glass in the outer ferrule opening to thereby provide a co-axial GTMS assembly; and
    g) subjecting the co-axial GTMS assembly to a heat treatment to hermetically seal the inner insulating glass to the terminal pin and the inner annular surface of the inner ferrule and to hermetically seal the outer insulating glass to the outer annular surface of the inner ferrule and the inner annular surface of the outer ferrule to provide the co-axial GTMS.

2. The method of claim 1, including providing the inner and outer insulating glasses being the same and selecting them from TA-23, Cabal-12, and Schott 8245.

3. The method of claim 1, including providing the inner and outer insulating glasses as TA-23 having a softening temperature of about 862° C.

4. The method of claim 3, including providing the TA-23 insulating glass having a glass working temperature that ranges from about 1,000° C. to about 1,100° C. and a glass working range from about 175° C. to about 275° C.

5. The method of claim 3, including providing the TA-23 insulating glass having a maximum heat treatment temperature that ranges from about 900° C. to about 950° C.

6. The method of claim 1, including providing the inner and outer insulating glasses as Cabal-12 having a softening temperature of about 726° C.

7. The method of claim 6, including providing the Cabal-12 insulating glass having a glass working temperature that ranges from about 775° C. to about 825° C. and a glass working range from about 50° C. to about a 135° C.

8. The method of claim 6, including providing the Cabal-12 insulating glass having a maximum heat treatment temperature that ranges from about 750° C. to about 770° C.

9. The method of claim 6, including providing the Schott 8245 insulating glass having a softening temperature of about 680° C.

10. The method of claim 1, including selecting the inner and outer ferrules from titanium, stainless steel, mild steel, nickel-plated mild steel, and aluminum.

11. The method of claim 1, including selecting the terminal pin from MP35N, stainless steel, a titanium alloy, platinum, a platinum alloy, palladium, a palladium alloy, and molybdenum.

12. The method of claim 1, including providing at least the first ends of the inner and outer ferrules residing along a plane aligned substantially perpendicular to the terminal pin axis.

13. The method of claim 1, including providing the first end of the inner ferrule extends further along the terminal pin axis than the first end of the outer ferrule.

14. A method for making a co-axial glass-to-metal seal (GTMS), comprising the steps of:
    a) providing a terminal pin extending along a terminal pin axis;
    b) providing an inner ferrule comprising an inner ferrule sidewall extending to an inner ferrule first end spaced from an inner ferrule second end, wherein the inner ferrule first and second ends extend to an inner ferrule inner annular surface defining an inner ferrule opening opposite an inner ferrule outer annular surface;

c) providing a sleeve-shaped inner insulating glass comprising TA-23 extending to an inner glass first end spaced from an inner glass second end, wherein the inner glass first and second ends extend to an inner glass inner annular surface defining an inner glass opening opposite an inner glass outer annular surface;

d) providing an outer ferrule comprising an outer ferrule sidewall extending to an outer ferrule first end spaced from an outer ferrule second end, wherein the outer ferrule first and second ends extend to an outer ferrule inner annular surface defining an outer ferrule opening opposite an outer ferrule outer annular surface; and e) providing a sleeve-shaped outer insulating glass comprising TA-23 having an outer glass opening extending to an outer glass first end spaced from an outer glass second end, wherein the outer glass first and second ends extend to an outer glass inner annular surface defining an outer glass opening opposite an outer glass outer annular surface;

f) positioning the terminal pin in the inner glass opening, positioning the inner insulating glass in the inner ferrule opening, positioning the inner ferrule in the outer glass opening, and positioning the outer glass in the outer ferrule opening to thereby provide a co-axial GTMS assembly; and g) subjecting the co-axial GTMS assembly to a heat treatment to hermetically seal the inner insulating glass to the terminal pin and the inner annular surface of the inner ferrule and to hermetically seal the outer insulating glass to the outer annular surface of the inner ferrule and the inner annular surface of the outer ferrule to provide the co-axial GTMS, h) wherein the first end of the inner ferrule extends further along the terminal pin axis than the first end of the outer ferrule.

15. The method of claim 14, including providing the TA-23 inner and outer insulating glasses having a softening temperature of about 862° C.

16. The method of claim 14, including providing the TA-23 inner and outer insulating glass having a glass working temperature that ranges from about 1,000° C. to about 1,100° C. and a glass working temperature from about 175° C. to about 275° C.

17. The method of claim 14, including providing the TA-23 inner and outer insulating glass having a maximum heat treatment temperature that ranges from about 900° C. to about 950° C.

18. A method for making a co-axial glass-to-metal seal (GTMS), comprising the steps of:

a) providing a terminal pin extending along a terminal pin axis;

b) providing an inner ferrule comprising an inner ferrule sidewall extending to an inner ferrule first end spaced from an inner ferrule second end, wherein the inner ferrule first and second ends extend to an inner ferrule inner annular surface defining an inner ferrule opening opposite an inner ferrule outer annular surface;

c) providing a sleeve-shaped inner insulating glass comprising Cabal-12 extending to an inner glass first end spaced from an inner glass second end, wherein the inner glass first and second ends extend to an inner glass inner annular surface defining an inner glass opening opposite an inner glass outer annular surface;

d) providing an outer ferrule comprising an outer ferrule sidewall extending to an outer ferrule first end spaced from an outer ferrule second end, wherein the outer ferrule first and second ends extend to an outer ferrule inner annular surface defining an outer ferrule opening opposite an outer ferrule outer annular surface; and e) providing a sleeve-shaped outer insulating glass comprising Cabal-12 having an outer glass opening extending to an outer glass first end spaced from an outer glass second end, wherein the outer glass first and second ends extend to an outer glass inner annular surface defining an outer glass opening opposite an outer glass outer annular surface;

f) positioning the terminal pin in the inner glass opening, positioning the inner insulating glass in the inner ferrule opening, positioning the inner ferrule in the outer glass opening, and positioning the outer glass in the outer ferrule opening to thereby provide a co-axial GTMS assembly; and g) subjecting the co-axial GTMS assembly to a heat treatment to hermetically seal the inner insulating glass to the terminal pin and the inner annular surface of the inner ferrule and to hermetically seal the outer insulating glass to the outer annular surface of the inner ferrule and the inner annular surface of the outer ferrule to provide the co-axial GTMS, h) wherein the first end of the inner ferrule extends further along the terminal pin axis than the first end of the outer ferrule.

19. The method of claim 18, including providing the inner and outer insulating glasses as Cabal-12 having a softening temperature of about 726° C.

20. The method of claim 18, including providing the Cabal-12 insulating glass having a glass working temperature that ranges from about 775° C. to about 825° C. and a glass working range from about 50° C. to about a 135° C.

21. The method of claim 18, including providing the Cabal-12 insulating glass having a maximum heat treatment temperature that ranges from about 750° C. to about 770° C.

* * * * *